UNITED STATES PATENT OFFICE.

HANS FREIMANN, OF STOCKUM, NEAR DUSSELDORF, GERMANY, ASSIGNOR TO COMPANY CARL JÄGER G. M. B. H., OF DUSSELDORF-DERENDORF, GERMANY.

AZO DYE.

1,006,929.  Specification of Letters Patent. Patented Oct. 24, 1911.

No Drawing. Application filed February 3, 1910. Serial No. 541,843.

*To all whom it may concern:*

Be it known that I, HANS FREIMANN, a citizen of the Confederation of Switzerland, and resident at 25 Anilinfarbenfabrik, Stockum, near Dusseldorf, in the German Empire, have invented certain new and useful Improvements in Azo Dyes, of which the following is a specification.

This invention relates to cotton azo dyes derived from sulfo-m-diamin-dicarbonyl-dioxy-dinaphthylamin-disulfonic-acid.

Amidonaphthol and its derivates, in which the hydroxyl and amido groups stand neither in the ortho nor the para position to one another, react with phosgen, and form ureas (see the German patent specification 116200 and 123693). Such products have either a symmetrical or unsymmetrical form according to whether two similar or two different amidonaphthols are enchained by the carbonyl group and yield valuable mono and diazo dyes. The only case extant in which an unsymmetrical urea has been produced by the reaction with phosgen, is by reaction with 2:5 amidonaphthol-7-sulfonic acid and p-amidoacetanilid which only combines with one molecule of a diazo compound (see German Patent 148505).

It has now been discovered that the sulfonic-acids of any m-diamin of the benzol group under the action of phosgen unite with the amidonaphthol-sulfonic-acids, in which the hydroxyl and amid groups are in neither the ortho nor the para position with regard to one another, and form a double urea. Thus from one molecule of toluylene-diamin-sulfonic acid 1:2:6:4 and two molecules of 2:5-amido-naphthol-7-sulfonic-acid, the following double urea is obtained.

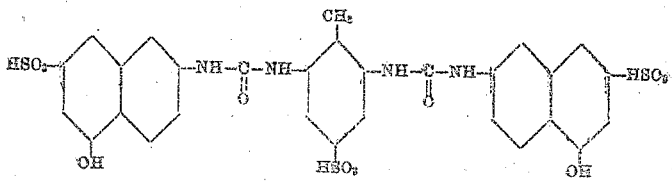

These new substances may be combined with two molecules of a diazo compound to form a valuable orange to bluish red dye which acts directly on cotton and is proof against organic acids and diluted mineral acids. Organic acids are without influence to the dyestuffs and even against diluted mineral acids the fastness remains a superior one.

Of the isomeric toluylene-diamin-sulfonic acids the acid

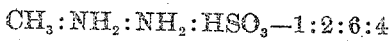

is preferable for condensation with amido-naphthol-sulfonic acid which is probably due to its symmetrical construction. The dyes produced from this new product of the condensation of this acid with phosgen and 2:5 amidonaphthol-7-sulfonic acid are characterized over the corresponding products derived from carbonyl-dioxy-dinaphthyl-amin-sulfonic-acid according to German Patent No. 116,200 by their brighter and more yellow shade. These dyes are also characterized by their great intensity of color and solubility in water.

By boiling with a diluted solution of sodium hydroxid the new azo dyes, according to the present invention, are saponified. If the product of the reaction is then acidulated with sulfuric acid, and filtered hot, the azo substances of the amido naphthol-sulfonic acid remain behind in the filter, and toluylene-diamin-sulfonic acid may be traced in the filtrate.

The material from which the new dyes are produced, was hitherto unknown and may be produced as follows: A mixture of 24 kgs. 2:5 amido-naphthol-7-sulfonic acid, 10 kgs. 1:2:6:4 toluylene-diamin-sulfonic acid, and 40 kgs. of calcinated soda, is dissolved in 200 to 250 liters of water. Phosgen gas is then passed slowly through the solution which is kept at ordinary temperatures, and stirred, and this is continued until the reaction is complete, that is, until the reacting mixture will not react with a nitrite. The new product partly precipitates out as a grayish sandy deposit. When, on the other hand, carbonyl-dioxy-dinaphthylamin-disulfonic acid is produced under analogous conditions, a jelly-like substance is found after it has been left standing for a short time.

The product of condensation is either separated from the neutral liquid or made into a dye by treating with an excess of soda and proceeding farther in the known manner. It is proved that the resulting dye has the above formula by the fact that the condensation and the formation of the dye only proceed smoothly when the original substances from which it is made are used in the quantities corresponding to the above formula.

The following are some examples of the dyes produced from the product of the condensation described above:

Example I: A diazo solution obtained in the known manner from 10.7 kgs. of o-toluidin is combined with the product of the condensation described above, which has been brought into the form of solution by means of an excess of soda. After 12 hours the hot solution of the dyestuff is precipitated with salt, pressed and dried. The dye colors cotton in bright orange red shades without requiring a mordant.

Example II: To 88.8 kgs. of sulfo-m-toluylene-diamin-dicarbonyl-dioxy-dinaphthylamin-disulfonic acid there is added while stirring well, a diazo solution prepared from 28.6 kgs. beta-naphthylamin.

The product is soon completed. The solution of dye is then boiled, precipitated with salt, pressed and dried. Unmordanted cotton will be colored in bright bluish red shades by means of this dyestuff. The dye is also much more intensive and brilliant than the product derived from carbonyl-dioxy-dinaphthylamin-disulfonic acid (see German Patent No. 122,904).

A similar dyestuff may be obtained from o-anisidin. Two molecules of different diazo compounds may in the known manner also be used for combination.

I claim:—

1. The process for producing an azo dye consisting in combining a sulfo-m-diamin-dicarbonyl-dioxy-dinaphthylamin-disulfonic-acid with two molecules of a diazo compound.

2. The process for producing an azo dye consisting in combining a sulfo-m-diamin-dicarbonyl-dioxy-dinaphthylamin-disulfonic-acid with two molecules of different diazo compounds.

3. The process for producing an azo dye consisting in combining sulfo-m-toluylene-diamin-dicarbonyl-dioxy-dinaphthylamin-disulfonic acid having the formula

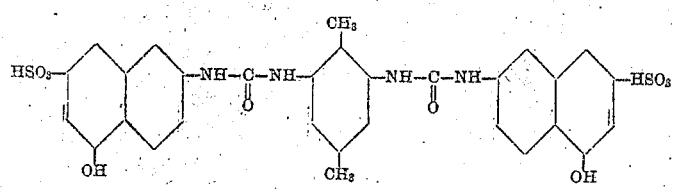

with two molecules of a diazo compound.

4. The process for producing an azo dye consisting in combining sulfo-m-toluylene-diamin-dicarbonyl-dioxy-dinaphthylamin-disulfonic acid having the formula

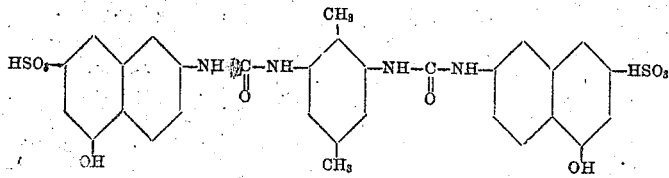

with two molecules of different diazo compounds.

5. The process for producing an azo dye consisting in the condensation of one molecule of toluylene-diamin-sulfonic acid 1:2:6:4 with phosgen and two molecules of amido-naphthol-sulfonic acid 2:5:7 and combining the product of condensation with two molecules of a diazo compound.

6. The process for producing an azo dye consisting in the condensation of one molecule of toluylene-diamin-sulfonic acid 1:2:6:4 with phosgen and two molecules of amido-naphthol-sulfonic acid 2:5:7 and combining the product of condensation with two molecules of different diazo compounds.

7. The process for producing an azo dye consisting in mixing 24 parts of amido-naphthol-sulfonic acid 2:5:7, 10 parts of toluylene-diamin-sulfonic acid 1:2:6:4 and 40 parts of calcined soda, dissolving the mixture in 200 to 250 parts of water, passing phosgen gas through the solution at ordinary temperature and stirring, and combining the resulting product of the condensation with two molecules of a diazo compound.

8. The process for producing an azo dye consisting in mixing 24 parts of amido-naphthol-sulfonic acid 2:5:7, 10 parts of toluylene-diamin-sulfonic acid 1:2:6:4 and 40 parts of calcined soda, dissolving the mixture in 200 to 250 parts of water, passing phosgen gas through the solution at ordinary temperature and stirring, and combining the resulting product of the condensation with two molecules of different diazo compounds.

9. As new products, the azo dyes which contain as a component a sulfo-m-diamin-dicarbonyl - dioxy - dinaphthylamin - disulfonic acid nucleus, said dyes being adapted to directly color cotton orange to blue red and being characterized by their solubility in water and intensity of color and being proof against organic acids and diluted mineral acids.

10. As new products, the azo dyes which contain, as a middle component, a sulfo-m-diamin - dicarbonyl - dioxy - dinaphthylamin-disulfonic acid nucleus, said dyes being adapted to directly color cotton orange to blue red and being characterized by their solubility in water and intensity of color and being proof against organic acids and diluted mineral acids.

11. As new products, the azo dyes which contain as a middle component sulfo-m-toluylene - diamin - dicarbonyl - dioxy - dinaphthylamin-disulfonic acid having the formula

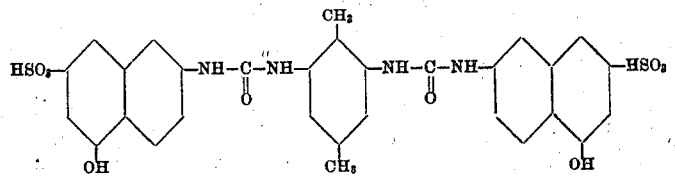

said dyes being adapted to directly color cotton orange to blue red and being characterized by their solubility in water and intensity of color and being proof against organic acids and diluted mineral acids.

In witness whereof I have hereunto set my hand in the presence of two witnesses.

HANS FREIMANN. [L. S.]

Witnesses:
 OTTO KÖNIG,
 CHAS. J. WRIGHT.